United States Patent [19]
Levy-Borochov et al.

[11] Patent Number: 5,506,051
[45] Date of Patent: Apr. 9, 1996

[54] TRANSPARENT SHEET COMPOSITES FOR USE AS BULLET-PROOF WINDOWS

[75] Inventors: Nicole Levy-Borochov, Tel Aviv; Murray Figov, Raanana, both of Israel

[73] Assignee: Nicolectronix Ltd. Laboratories, Tel Aviv, Israel

[21] Appl. No.: 186,861

[22] Filed: Jan. 27, 1994

[51] Int. Cl.[6] .................................................. B32B 7/02
[52] U.S. Cl. .................. 428/332; 428/34; 428/212; 428/214; 428/220; 428/412; 428/423.1; 428/424.2; 428/425.6; 428/411; 428/500; 428/911; 52/786.11; 52/786.12
[58] Field of Search ................................. 428/212, 214, 428/220, 411.1, 412, 415, 423.1, 424.2, 425.6, 441, 500, 911, 34, 332; 52/786.11, 786.12

[56] References Cited

U.S. PATENT DOCUMENTS

| | | | |
|---|---|---|---|
| 3,624,238 | 11/1971 | McKenzie | 428/81 |
| 3,630,814 | 12/1971 | Arnold | 428/34 |
| 3,634,177 | 1/1972 | Glaser | 428/412 |
| 3,658,636 | 4/1972 | Beckmann et al. | 428/437 |
| 3,671,370 | 6/1972 | Littell, Jr. | 428/38 |
| 3,864,204 | 2/1975 | Shorr et al. | 428/213 |
| 4,062,887 | 12/1977 | Chang et al. | 560/185 |
| 4,079,161 | 3/1978 | Kile | 428/220 |
| 4,085,092 | 4/1978 | Chang et al. | 528/80 |
| 4,125,669 | 11/1978 | Triebel et al. | 428/412 |
| 4,130,684 | 12/1978 | Littell, Jr. et al. | 428/212 |
| 4,198,468 | 4/1980 | Molari | 428/412 |
| 4,243,719 | 1/1981 | Holmes | 428/411 |
| 4,297,185 | 10/1981 | Chevreux et al. | 522/96 |
| 4,321,777 | 3/1982 | Sauret et al. | 52/308 |
| 4,328,277 | 5/1982 | Molari, Jr. | 428/215 |
| 4,355,077 | 10/1982 | Chevreux et al. | 428/412 |
| 4,556,600 | 12/1985 | Kraemling et al. | 428/216 |
| 4,594,290 | 6/1986 | Fischer et al. | 428/212 |
| 4,599,274 | 7/1986 | Ando et al. | 428/442 |
| 4,717,739 | 1/1988 | Chevreux et al. | 522/79 |
| 4,739,412 | 4/1988 | Lee | 348/824 |
| 4,742,147 | 5/1988 | Nichols | 528/75 |
| 4,812,359 | 3/1989 | Hall | 428/332 |
| 4,841,372 | 6/1989 | Lee | 348/824 |
| 4,861,666 | 8/1989 | LeGrand et al. | 428/412 |
| 4,879,183 | 11/1989 | Mannheim | 428/437 |
| 4,938,831 | 7/1990 | Wolf, Jr. | 156/275.3 |
| 4,964,938 | 10/1990 | Bachmann et al. | 156/273.7 |
| 5,190,825 | 3/1993 | Arribart et al. | 428/412 |
| 5,229,204 | 7/1993 | Labock | 428/335 |

FOREIGN PATENT DOCUMENTS

| | | |
|---|---|---|
| 2216136 | 10/1989 | United Kingdom . |
| 8705307 | 9/1987 | WIPO . |
| 9103503 | 3/1991 | WIPO . |
| 9217536 | 10/1992 | WIPO . |

OTHER PUBLICATIONS

Chemical Abstracts, vol. 109, 1988, Cite: 109:191799u.
Chemical Abstracts, vol. 106, 1987, Cite: 106:51336d.

*Primary Examiner*—Patrick J. Ryan
*Assistant Examiner*—Marie R. Yamnitzky
*Attorney, Agent, or Firm*—Browdy and Neimark

[57] ABSTRACT

An improved transparent bullet-proof laminate is formed with an energy absorbing transition layer located between preformed laminae of glass and/or plastic, such as polycarbonate, the transition layer constituting a cured aliphatic urethane acrylate with optionally up to 70% of a monofunctional monomeric acrylate, the transition layer in liquid form having a viscosity preferably no greater than 1000 cps and in cured state having a toughness of at least 0.1 MPa, and elastic modulus no greater than 25 MPa and an elongation of at least 20%.

19 Claims, 1 Drawing Sheet

TRANSPARENT SHEET COMPOSITES FOR USE AS BULLET-PROOF WINDOWS

FIELD OF INVENTION

The present invention relates to improvements in transparent protective panels, such as bullet-proof windows, and more particularly to improvements in adhesive compositions for forming bullet-proof windows, methods of manufacturing bullet-proof windows, and the resultant bullet-proof windows.

BACKGROUND OF INVENTION

Transparent armor against bullets has been in widespread use for many years. Such so-called "bullet-proof" windows vary from thick plate glass layers bonded together, to complex sandwiches of plastic layers bonded to each other or to glass. Such sandwiches must be completely transparent, have no optical distortion, have maximum ballistic resistance and be as light-weight as possible to be fully satisfactory. Depending on the use of such armor, it may have to be resistant to vibration and shock, scratching and adverse environmental conditions such as low and high temperatures, rain, frost and snow.

Many of the functions of the various layers of the sandwich are well defined. The characteristic properties of glass sheet which may form such a layer are its strength as well as its abrasion resistance. This abrasion resistance is essential in particular in outdoor and/or vehicular applications where highly abrasive particulates such as aluminum oxide and silicon oxide in dust are encountered at slow and high speeds. Because of the hardness of such dust, only glass which is of similar or greater hardness than the dust can withstand the abrasive impact of such dust without losing its transparency. The plastic solid layer serves the purpose of absorbing energy via its properties of high impact resistance.

The interlayer between the glass and plastic layer serves two or three purposes depending on whether identical or non-identical materials (e.g. two glass sheets, two polycarbonate sheets or one sheet of each) are bonded.

Between non-identical materials the purpose of the interlayer is to:

(a) merely provide adhesion between the layers, in which case such a layer would characteristically be of thickness less than 1 mm;

(b) provide an energy absorbing path in the transition zone between hard and brittle material such as glass and the flexible and ductile material such as polycarbonate;

(c) provide a stress-free transition zone between the two solid layers which are of widely different linear expansion coefficients.

It is evident that the development of a suitable sandwich is an extension of the prior art of manufacturing safety glass by laminating sheets together, but the stringency of the requirements for bullet proof properties far exceed those for motor vehicle safety glass.

This has led to continual effort to improve such laminates. For instance, U.S. Pat. No. 3,658,636 published in 1972 provided a safety glass composite which would meet both the requirement of motor vehicles and also be able to withstand the impact of bullets. It tackled the difficulties of replacing the glass inner sheet of the laminate with plastic, whilst acknowledging an appreciation of the advantages of doing this. U.S. Pat. No. '636 thus deals with composites obtained by bonding glass to polyamide with a plasticized polyvinyl butyral layer having a preferred thickness of 0.76 mm by pressing together the sandwich under heat. As a test for the bullet resistance this patent describes the extent of damage to a 20×20 cm panel by a 9 mm bullet fired under specific conditions.

However, the method of producing the laminate of U.S. Pat. No. '636 has various disadvantages as described in U.S. Pat. No. 4,297,185. For instance the method of U.S. Pat. No. '636 is time consuming and expensive because in addition to the time spent for heating, additional time must be spent for slow cooling the pieces to prevent possible breakage due to thermal shock. Moreover, the adhesives have high viscosities which make the elimination of air bubbles a problem.

A further development is described in U.S. Pat. No. 3,671,370 (published in 1972) which points to the use of polycarbonate as the plastic layer. It also describes the function of polyvinyl butyral previously mentioned as not only an adhesive but as a resinous interlayer or transition material for helping in the absorbing of the energy of the bullet. In addition, it describes a further transition material, a two component polyurethane. The claimed multiple safety glass unit is indicated as having been tested for penetration by subjecting it to a 50 caliber armor piercing projectile. However, the use of a two component polyurethane as described in U.S. Pat. No. '370 has evident disadvantages. The material has to be heated under vacuum before and after the addition of the curing agent to eliminate air, and curing conditions given are for a long period at a high temperature (22 hours at 175° F.) suffering from the same disadvantage as previously mentioned.

Attempts have been made to simplify the production of the glass/plastic laminates by using adhesives cured by U.V. radiation. The above mentioned U.S. Pat. No. 4,297,185 (October 1981) and others (e.g. U.S. Pat. No. 4,355,077) describe U.V. curable compositions comprising polyurethane pre-polymers, co-polymerizable monomers and photo initiators. However, these layers do not appear to have the characteristics of transition layers as they are required to be relatively thin with a preferred thickness defined by a weight of 5–10 g/m² going up to a maximum thickness of 200 microns. Moreover, although these materials are described for use in transparent armor, no examples show tests for the impact of bullets, indicating that the function of this particular layer within the system is primarily adhesive and not energy absorbing.

The Lee U.S. Pat. No. 4,841,372 is directed to a cathode ray tube contrast enhancement system and discloses a resin bonding system for bonding a flat implosion protection panel to the flat face plate of a cathode ray tube, the resin bonding system being designed for differential adhesion so that the face plate separates more easily from the resin than does the implosion protection panel. The adhesive in question is provided in two separate layers having different adhesive properties, the outer resin layer adhering tightly to the implosion panel and the inner layer 30 adhering to the face plate and weakly to the outer layer. The outer layer comprises a mixture of a multifunctional urethane acrylate oligomer, a monofunctional acrylic monomer and optionally one or more of a difunctional acrylic monomer and trifunctional acrylic monomer, and critically at least 1% by weight of an organic dye which constitutes a neutral density filtering agent. The inner layer, designed to adhere less strongly comprises a mixture of a multifunctional urethane acrylate oligomer, a monofunctional acrylic monomer, a releasing agent and optionally a difunctional acrylic monomer and a trifunctional acrylic monomer.

The U.S. Pat. No. 4,938,831 in the name of Wolf discloses a bonding method for preparing automotive headlamp assemblies using a light curable adhesive composition consisting of a low molecular weight aliphatic urethane acrylate polymer, N-vinyl pyrrolidone and at least one additional material which may be a monofunctional acrylic monomer, a polyfunctional acrylic monomer or a polyfunctional polyester acrylate oligomer.

In advancing the art of producing transparent bullet proof laminates, it is evident that not only would skilled workers in this art seek to develop easier methods of producing the laminates, but that the demands on the effectiveness of the sandwiches would be further increased. Thus, those of the previously mentioned patents that provide instances of firing at test panels describe single shot results. GB 2098650 provides protection against multiple shots by combination of multiple layers. The transition layer is a thin, i.e. 0.86 mm thick, polysiloxane-polycarbonate copolymer which can provide little energy absorbing effect. Whilst little practical detail is given of the application of this layer into the sandwich, it can be assumed that it will suffer from the problems of air bubbles and two component curing problems previously discussed.

The problem of multiple firings is specifically a practical one that bullet resistant materials are likely to have to meet in cases where shots would be fired in close groupings. Thus, a first shot may severely damage the armor without exiting the opposite side, but could provide sufficient damage to enable a second bullet to exit. Therefore, greater resistance to penetration as well as smaller radii of damage are being sought for improved performance. GB 2098650 demonstrates an awareness and an attempt to achieve higher performance. Still, insofar as is known, the deficiencies of the prior art, such as noted above, have not been eliminated.

SUMMARY OF INVENTION

It is, accordingly, an object of the present invention to provide improved transparent armor.

It is another object of the present invention to overcome deficiencies in the prior art, such as those noted above.

It is a further object of the present invention to provide transparent composites which will give protection against multiple shots.

It is still another object of the present invention to provide an improved method of producing such composites.

It is still a further object of the present invention to provide excellent anti-ballistic sandwiches which are optically and physically of good quality, able to resist multiple shootings, and embodying a thick transition layer free of air or solvent and which, during the manufacturing stage, has suitable flow characteristics which improve the ease of manufacture of the sandwich, and yet after curing give appropriate adhesive and energy absorption characteristics so that greatly improved ballistic resistance to multiple shootings is achieved.

It is yet another object of the present invention to provide an adhesive layer that not only acts as a transition adhesive, but which is also a bullet-resistant layer, and which is non-heat curable either by visible light or by U.V. even through thick (8 mm) polycarbonate.

It is yet a further object of the present invention to provide light cured adhesive layers and a method of application to join glass to glass to provide a composite suitable for use in transparent ballistic resistant products.

It is yet another object of the present invention to provide a method using a single component adhesive to construct suitable ballistic resistant transparent sandwiches, free from optical and physical defects.

Other objects are to provide a system whereby thick transition layers can be cured with medium pressure U.V. radiation in a matter of seconds; and to provide compositions and methods of constructing a suitable bullet-proof window laminate with minimum energy requirements.

These and other objects of the present invention are achieved by the use of a photo polymerizable adhesive of specific composition, especially in conjunction with its method of utilization, which can be cured in substantially thicker layers than hitherto possible in order to provide effective transition layers so as to serve not only an adhesive function but also an effective energy absorbing function.

BRIEF DESCRIPTION OF DRAWING

The above and other objects of the present invention as well as the nature and advantages thereof will be more apparent from a detailed description of embodiments taken in conjunction with the drawing, wherein.

DETAILED DESCRIPTION OF EMBODIMENTS

Figure 1:
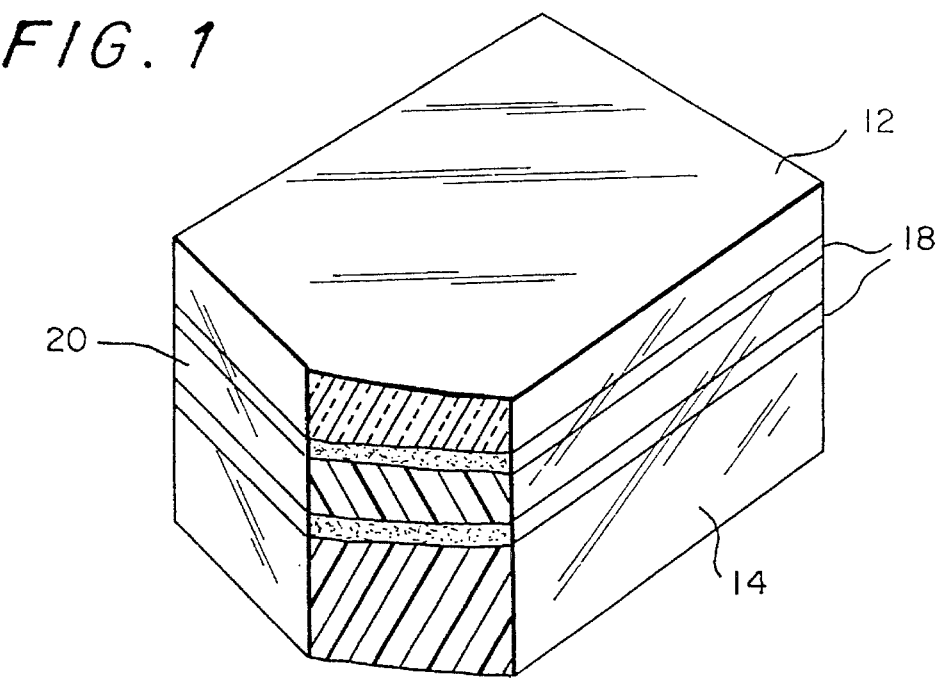
FIG. 1 is a perspective view, partly broken away, showing an embodiment of a transparent bullet-proof laminate in accordance with the present invention.

As described in the prior art, there is a general recognition of the use of polyurethane compositions as adhesives and transition layers. The curing of such one-component materials by photopolymerization provides an easier method of manufacture than the two component heat curing method. It has now been found that whereas the use of certain compositions of photopolymerized polyurethane layers as transition layers between either (1) glass and plastic, or (2) plastic and plastic show outstanding resistance to multiple shootings in minimal layers of composites, this is only really effective when the transition layer exceeds 1 mm in thickness, with layers of 2 mm or more being even more effective.

However, such transition layers would normally present problems in U.V. curing. It has now been found that it is these problems that provide obstacles in the use of photopolymerized polyurethane in that they produce unacceptable optical and physical defects within the transition layer. These problems, which have hitherto frustrated and inhibited the prior art, are described as follows:

(1) Shrinkage: On curing, U.V. curing material may shrink by approximately 10% (measured by change of density of liquid to solid). In thick layers where the curable liquid is filled into a cell with spacers, this can result in local delamination. On polymerization, air can be drawn into the cell producing very large localized bubbles.

(2) Difficulty of curing thick layers: Generally U.V.-curing compositions are used in thin coating or in adhesive applications, as depth of cure is usually limited.

(3) Heating: U.V. curing is an exothermic reaction. The heat produced in thick sandwiches is transmitted to the plastic or glass, producing problems of uneven expansion and even warping.

(4) Where polycarbonate is one of the layers of the sandwich, it was found that the prepolymer compositions may attack the surface to give an undesired frosted effect. This effect occurs if the prepolymer finds its way to the outside of the surface of the polycarbonate, but only occurs within the sandwich after curing.

(5) Wrinkling within the transition layer: The layers of the prepolymer closest to the surface of the outer plastic or glass are subjected to different curing conditions than those of the innermost materials.

(6) Fogging and the creation of fine scratches (scintilla): The entire transition layer becomes fogged or a scintered effect occurs, both of which adversely affect the optical properties.

(7) If polyvinyl butyral is used together with glass and polycarbonate, both materials filter U.V.-light and thus transmit U.V. light only poorly. Therefore, it is not possible to find a satisfactory light curing path through either from the polycarbonate side or from the glass/polyvinyl butyral side.

From tests on such thick layers of U.V. curing material, it would be reasonable to conclude that it is not possible to make and use such thicknesses. However, it has now been found that with the type of formulations developed and the methods of fabrication and curing in accordance with the present invention it is possible to produce excellent anti-ballistic sandwiches that are optically and physically of good quality and that also resist multiple shootings. The present invention successfully provides thick layers of one component transition adhesives, free of air or solvent and with suitable flow characteristics which improve the ease of manufacture of the sandwiches and, after curing, give appropriate adhesive and energy absorption characteristics so that greatly improved ballistic resistance to multiple shootings is achieved.

The present invention provides an adhesive layer that not only acts as a transition adhesive, but is also in itself a bullet-resistant layer. This layer has the advantages of non-heat curing either by U.V. or by visible light or optionally can be cured by electon beam or by a short period of heating, the U.V. curing being possible even by irradiating through thick (8 mm) polycarbonate. It is also possible, according to this invention, to provide light cured adhesive layers and methods of application to join glass to glass to provide such composites suitable for use in transparent ballistic resistant materials. The present invention further provides methods whereby such single component adhesives may be used to construct suitable sandwiches which are free from optical and physical defects. It is a distinctive feature of this invention that thick transition layers can be cured with medium pressure U.V. radiation in a matter of seconds.

In recent years, solvent free adhesives have been developed based on acrylic oligomers, monomers, diluents and photoinitiators. These mixtures are cured by irradiation by U.V. light. Such radiation causes the generation of free radicals and results in cross-linking of the acrylic oligomers/monomers to produce the finished adhesive. They have the advantages that curing is fast and at a room temperature, they are solvent free and are mono-component with long pot life. The parts to be bonded can be manipulated whilst the adhesive is in contact until the configuration is satisfactory before exposure to the U.V. light.

Hitherto and as noted above, such adhesives have not found a use as thick transition layers in anti-ballistic sandwiches because in practice they do not produce a satisfactory product, e.g. for reasons previously explained, they delaminate both during manufacture, under adverse environmental conditions and on impact, react with the surface of plastics producing fogging, and exhibit shrinkage on curing thus producing non-uniform coatings. Although such compounds have found application in ordinary laminating where very thin layers are sufficient, they have not been found suitable for the transition layer of bullet proofing composites where thicker layers are needed.

Moreover, in the prior art, there seems to be little or no attention paid to the need for an anti-ballistic sandwich to be resistant to drastic changes in environmental conditions. It has now been found that sandwiches according to the present invention can be cycled from −20° C. to 60° C. and can withstand thermal shock without any signs of damage. In addition, prolonged exposure to high humidity (95% RH) leaves the resultant product unaffected.

In this regard, it has now been discovered that certain combinations of acrylic monomers and oligomers as defined by their chemical composition and certain physical and adhesion properties, when used to construct window laminates according to the methods of the present invention, give outstanding anti-ballistic properties in addition to excellent environmental performance. Such adhesives may be used in combinations of two or more layers to achieve the desired properties.

A layer which henceforth will be referred to as the "transition layer" may be constructed from acrylic materials to function both as an adhesive layer and as an outstanding bullet resistant transition layer in itself. An essential part of the adhesive is an acrylic oligomer. Whereas a large range of acrylic oligomeric materials are commercially available, it has been found that it is preferable to use aliphatic urethane acrylates or aliphatic polyether acrylates of specified physical properties noted below. If the acrylic oligomer is not aliphatic, the transition layer tends to undergo yellowing as it ages; consequently significant quantities of non-aliphatic oligomer can be tolerated only in environments where yellowing is acceptable.

Suitable oligomers for the present invention are those which when cured by 2% of photoinitiator give an elongation of preferably at least 20% combined with toughness of desirably over 0.2 MPa and an elastic modulus of not greater than 40 MPa. Examples of oligomers that fall into this category and have been found suitable are Craynor 963, 964, 960, 945A60V and CN500 (pre-polymers marketed by Cray Valley), Ebecryl 230, Ebecryl 270 (pre-polymers marketed by UCB), Uvithanes 788 and 892, 893 (pre-polymers marketed by Thiokol). The use of some of these oligomers is shown in U.S. Pat. No. 4,938,831 at column 7; U.S. Pat. No. 4,297,185 in the examples; and U.S. Pat. No. 4,841,372 at column 4. Such oligomers may in themselves contain non-oligomeric diluents as they are sold as such for ease of handling.

TABLE I

| Substance | Young's Modulus | Toughness | % Elongation |
|---|---|---|---|
| Ebecryl 270 | 9.4 | 0.33 | 27.9 |
| Ebecryl 230 | 2.3 | 0.20 | 44.5 |
| Ebecryl 4883 | 45.2 | 1.77 | 36.5 |
| Phorolan 6140 | 89.7 | 3.07 | 35.8 |
| Ebecryl 284 | 291.0 | 3.64 | 25.1 |
| Craynor 945A60V | 39.3 | 1.14 | 33.5 |
| Uvithane 892 | 4.0 | 0.60 | 59.7 |

Table I above shows some examples of oligomer cured with 2% photoinitiator, with elastic modulus, toughness and percentage elongation being given. Thus, it can be seen that by the parameters defined above, Ebecryl 4883, Phorolan 6140 and Ebecryl 284 have too high values of Young's modulus to be suitable for the present invention, whilst they have suitable toughness and elongation.

The oligomer combined with the photoinitiator, even where the physical properties of the cured material conform to values as seen in Table I, may still have an undesirably high viscosity. High viscosity materials are more difficult to cure free of air bubbles and although such high viscosity materials have now been successfully used according to the present invention, it is easier to work with low viscosity compositions, i.e. compositions having a viscosity of less than about 1000 cps.

Table II shows the elongation, toughness and elastic modulus of examples of transition layers that contain monomers.

TABLE II

| Substance | Young's Modulus | Toughness | % Elongation |
|---|---|---|---|
| Ebecryl 270/Phenoxy Ethyl Acrylate 1:2.2 ratio | 2.2 | 0.25 | 50.6 |
| Ebecryl 230/Oxyethylated Phenol Acrylate 1:1 | 1.3 | 0.028 | 21.9 |
| Uvithane 892/Phenoxy Ethyl Acrylate 1:2.2 | 1.3 | 0.21 | 59.9 |
| Ebecryl 270/Lauryl Acrylate 1:2.2 | 1.0 | 0.025 | 22.1 |
| Uvithane 788/Phenoxy Ethyl Acrylate 1:2.2 | 5.2 | 0.61 | 53.4 |
| Ebecryl 230/Isobornyl Acrylate 1:1 | 1.8 | 1.64 | 238.0 |
| Ebecryl 270/Isobornyl Acrylate 3:2 | 23.0 | 4.97 | 123.0 |

For the best results of bullet resistance the elongation of the cured transition layer itself, whether substantially all cured oligomer or oligomer containing monomer, must not be less than 20%, the toughness not less than 0.02 MPa, desirably not less than 0.1 MPa, and the elastic Young's modulus not greater than 25 MPa, preferably no greater than 20 MPa. Table II shows suitable preferred combinations of oligomer and monomer.

It has been found that the required physical properties of the complete transition layer adhesive can most easily be achieved by the addition of suitable monomer. Monomeric acrylates are commercially available with a wide range of chemical composition and functionality (number of acrylate bonds). It has been found that monofunctional monomers have a radical effect on the elasticity when combined with aliphatic urethane acrylates whilst maintaining relatively high strength. Examples of such monomers are isodecyl acrylate, isobornyl acrylate, tetrahydrofurfuryl acrylate and 2-phenoxy acrylate, methoxyethyl acrylate, isooctyl acrylate, ethoxyethoxyethyl acrylate, ethoxylated nonyl phenol acrylate, lauryl acrylate, monohydroxy caprolactone monoacrylate. The percentage by weight of oligomer in the formulation must not be less than 30% and the monomer not greater than 70%. If the proportions are such that there is too much monomer and insufficient oligomer to be within the range stated, then the materials show increased elasticity, but the toughness is less than the minimum stated. When used, the quantity of monofunctional monomer should normally be at least 20%.

The initiator or combination of initiators used are those known to the art and may be used in combinations that are suited to the light source available and to the filtration effect of the top layer of the sandwich, be it glass, polycarbonate or acrylic polymer. Suitable initiators are for instance Darocure 1173 (2-hydroxy-2-methyl-1-phenyl propan-1- one), Darocure 1116 [1 (4-isopropylphenyl) 2-hydroxymethyl propan-1- one] and Irgacure 651 (Benzil dimethyl ketal), Irgacure 184 (1-hydroxy cyclohexyl phenyl ketone) and Irgacure 907 {2-methyl-1-[4-(methylthio) phenyl]- 2-morpholino propane-1}, these being marketed by Ciba Geigy. See, for example, columns 3 and 4 of U.S. Pat. No. 4,841,372.

Where the light source has to penetrate a thick layer of polycarbonate, it has been found that the addition of between 0.1 and 2% of a peroxide such as benzoyl peroxide, cumaryl peroxide or lauryl peroxide can be used to activate the material so that good curing can be achieved.

Optionally, commercially available tackifiers such as modified rosin esters can be added to the transition layer composition, if desired. Other suitable tackifiers are for example hydrocarbon, coumarone and indene resins, vinylated tackifier made from the reaction of rosin with glycidyl methacrylate natural rubber, polyisoprene and terpene phenolic tackifiers.

Inhibitors are desirably used to ensure that the liquid transition preparations do not react before radiation. Such inhibitors are for example phenothiazine, benzoquinone, methoxy phenol, bisphenolic butylated hydroxy toluene, 2.6 di-t-butyl 4-methyl phenol and tris nonyl phenyl phosphite, and are present in concentrations of under 0.1%.

Additionally, a UV stabilizer may be added in a maximum amount of 1% to ensure that the final product is unaffected by prolonged exposure to sunlight. Such materials are for example benzophenone and hindered amine stabilizers.

Even using the type of composition of transition layer described above, problems of application are often encountered in construction of the sandwich, which however, are overcome by following certain procedures according to the present invention.

As described above, a problem of previous materials used for transition layers is their tendency to retain air in the form of air bubbles. Materials require deaerating and even after such treatment they are likely to develop and retain air bubbles. This is for the most part due to the use of high viscosity materials for transition layers. As noted above, the preferred pre-polymer materials used in this invention have viscosities of less than 1000 cps at the temperature of lay-up of the laminate, and at such viscosities the presence of air bubbles can be most easily eliminated. However, a method by which air bubbles can be eliminated from high viscosity pre-polymer mixes at the time of fill has now been developed as explained below.

As the transition layer may range in thickness of up to several millimeters, it must be contained between the two transparent laminae to be bonded by means of a sealant framework. This framework may be of a compressible elastomer with pressure sensitive adhesive on both sides. Previous systems where thinner adhesive layers are cured in situ utilize spacers. In the case of one embodiment of the present method, the formation of thick transition layers requires a suitable sealant that will also act as the spacer.

This sealant material must not only provide good air-tight adhesion to the glass and plastic surfaces used, but it must also be of a compressible nature. This is because, on curing, the transition layer composition undergoes considerable shrinkage. This causes the two transparent laminae to move together unless they encounter resistance. If the spacers are rigid and non-compressible, then the laminae will not be able to move and the force of adhesion on one or both of the surfaces will be overcome by the forces of shrinkage and delamination will be evident at least in the areas of the spacers. As suitable sealant/spacer material there may be mentioned compressible tapes of adequate thickness which are commercially available in thicknesses of 1–3 mm, and elastomeric gasket material.

Figure 3:
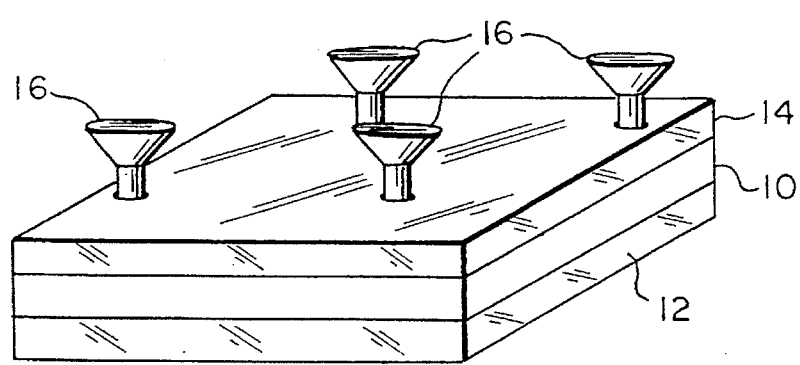
FIG. 3 is a schematic perspective view showing another stage of a method in accordance with the present invention for producing a product in accordance with the present invention.

The liquid transition layer composition is filled into the space between the two laminae by pumping it through a hole in the corner of the sandwich. Air is pushed out through the hole at the opposite corner until the cell is entirely filled with the liquid composition. The two holes are then sealed. It has been found that especially for transition layers equal or greater than 2 mm thickness, it is advantageous that the sandwich has holes drilled in the uppermost member in each of its four corners. The liquid is filled through the hole. The other holes are provided with tightly fitted reservoirs, e.g. funnel shaped plugs. When the cell is full, the filler pipe is removed and a fourth funnel shaped reservoir replaces it as shown in FIG. 3. With reference to FIG. 3, the sealant spacer 10 separates the laminae 12 and 14 with a gap of preferably at least 2 mm therebetween. The transition layer composition is poured into the funnel-shaped plugs 16.

Liquid transition layer composition is then used to top up each reservoir 16. It has been found that during irradiation before the liquid material is completely cured it undergoes changes in volume that produce forces in the system which appear to act at the corners of the composite. By providing the small hydrostatic force on the liquid by means of the reservoirs 16, the liquid transition material can move within the cell without losing contact with the solid surfaces. The reservoirs 16 also permit any air that is drawn into the material by contraction during curing to escape by rising upwards whilst the transition layer material is still liquid. The reservoir system shown is the simplest possible. It is also possible to have a centrally fed closed system where the hydrostatic pressure on the corners is carefully metered.

Although it has been found that the reservoir system guarantees excellent results, it has also been found possible to work without it especially in the case of single layer glass/polycarbonate sandwiches. In this case the sandwich is provided with just two holes and is filled from one hole with the air escaping from the other as described previously. The holes are then blocked. As it is much easier to drill holes in polycarbonate, the sandwich may be filled from the polycarbonate side, sealed and then irradiated from the glass side. While it is possible to use this method for filling up to 2 mm, for thicker coatings the reservoir method is preferred. For this particular method of filling, it has been found that it is preferable to work with polycarbonate layers of thickness greater than 8 mm. This is because the heat generated during the curing of the transition layer may cause temporary warping of thinner polycarbonate. This puts the bonding between the transition layer and both polycarbonate and glass or other plastic under strain, causing potential problems of delamination in cases where the polycarbonate is less than 8 mm thick, using the two hole system.

An alternative method of filling cells has been developed which overcomes this constraint and permits all thicknesses of plastic and glass layers to be used without encountering such problems. It also avoids the necessity of drilling holes in the plastic or glass layers in order to fill according to the previously described methods. The following stages are found to be necessary for such a method.

(1) The plastic layer is provided with a spacer that is bonded into place around its edges.

(2) The liquid uncured transition material is carefully poured onto the plastic to avoid the appearance of air bubbles. The total quantity is controlled to fill half the height of the spacer, e.g. if the spacer is for 2 mm height, the transition material is poured to provide a layer 1 mm thick. The layer is then U.V. cured with a medium pressure mercury vapor lamp at high speed, e.g. 8 meters per minute at a lamp height of 15 cms. It is then allowed to cool so that any deformation of the plastic caused by heat transfer is lost.

(3) More liquid transition material is then poured onto the initially cured transition layer, filling to the very top of the spacers until the material seeps over the top.

Figure 2:
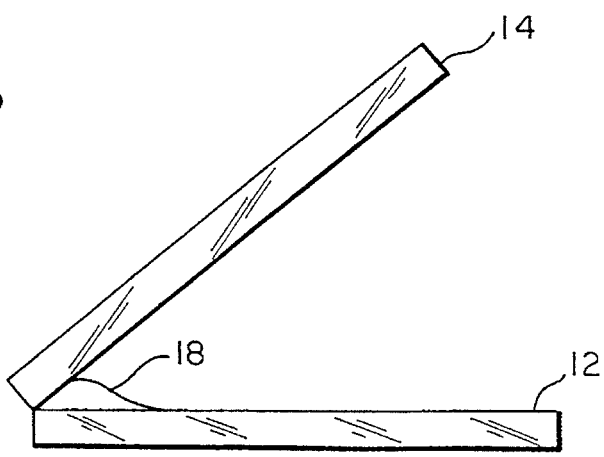
FIG. 2 is a schematic side view showing a step in the manufacture of a laminate in accordance with the present invention, such as that of FIG. 1.

(4) The glass to be used as the other half of the sandwich is slowly lowered like a lid on a hinge from one edge of the glass/polycarbonate similar to what is shown in FIG. 2. It is possible to do this so that no air bubbles are introduced and a wave of material slowly travels up the sandwich as the glass is lowered. The sandwich is then exposed through the glass to U.V. light to bond the sandwich, avoiding all delamination, bubbles or any other unacceptable defect in the finished composite. A typical curing speed would be 2.5 meters per minute at 15 cms. distance with a medium pressure mercury vapor lamp.

It has been found possible to apply this technique to a large variety of situations. It is possible to build up transition layers to any required thickness by curing a succession of layers. It is possible to use a variety of plastics of various thickness either in combination with one another or with glass or to use the technique to bond glass to glass even for layers other than the transition layer. For glass to glass it is possible to dispense with the first filling stage because of general lack of significant heat distortion of the glass.

When necessary, the quality of the cured film can be enhanced by using filters with the U.V. light. Also, if it is necessary to cure through a plastic layer, the final layer that needs to be cured through the "lid", i.e. the upper polycarbonate lamina 14 can be kept to a minimum thickness so that the weak radiation remaining after filtration by the plastic lid can still effectively give complete curing. A distinct advantage of this method is the high speed of cure at all stages. However, the preferred method for curing through plastic layers, especially through polycarbonate, is the reservoir system previously described as it provides a deep one cure step for the transition layer, giving good homogeneity.

The invention is not confined to any particular combination of layers of glass and plastic, nor to any particular thickness of these layers, except the transition layer must have a thickness of at least 1 mm. Thus the embodiments described offer resistance to penetration from bullets that is better than laminates of comparable thickness or weight. It should be understood by those of ordinary skill in the art that various combinations of layers can be made without departing from the invention.

It is also possible to precoat the glass and plastic laminae to promote adhesion and to protect the plastic against any attack from the bonding material. Examples of adhesion promoting materials are: γ-glycidoxy propyltrimethoxy silane, γ-chloropropyl trimethoxy silane, γ-aminopropyl triethoxy silane, bis-(betahydroxyethyl)-γ-aminopropyl triethoxy silane. By doing this, it is possible to use transition layers with inherently weaker adhesion to glass and plastics and to use the stronger adhesion of the pre-coat to both the glass or plastic and to the transition layer itself. Examples of such pre-coats may be taken from the known art of compounding together U.V. curing monomers, oligomers and initiators which give water white layers and strong adhesive properties. Such layers, together with the transition layers described above, contribute to form a composite transition layer with part of it giving the elastic absorption layer and part giving the protection against delamination.

As referred to immediately above, non transition layers may be used as pre-coats for plastic and glass. These layers are characterized by high adhesion properties but not necessarily high elasticity. Where they are in contact with the transition layer, they firmly bond to the transition layer. They are also used as adhesive material between glass and glass or plastic, or plastic and plastic. Such materials are based on urethane oligomers, photoinitiators and combination of monomers; not necessarily mono-acrylic. They do not in themselves constitute novelty. However, if these conventional adhesive layers are applied as glass to glass or other combination adhesives as opposed to pre-coats as in the present invention, regardless of how much they are previously treated for air removal, it is very difficult to stop air entering into the system during use.

It has now been discovered that it is possible to apply the precoat adhesive material between two surfaces, with or without a spacer, and to lower the second surface as shown in FIG. 2, so that a wave of pre-coat adhesive material 18 slowly travels from the hinge line between the two laminae to fill the space between the facing laminae surfaces. If a series of clamps or a clamping framework is applied after the surfaces are fully in contact, clamping can be done from where the hinge was. Any trapped air bubbles slowly travel away from the hinge edge as clamping pressure is successively applied starting from the hinge edge and moving up the two sides and finally clamping the fourth side. Eventually, all bubbles will disappear out of the edge opposite and parallel to the original hinge.

FIG. 1 illustrates a transparent bullet proof laminate in accordance with the present invention, the illustrated embodiment showing one lamina 12 of glass and another lamina 14 of polycarbonate, these being held together by two very thin pre-coat adhesive layers 18, formed for example as explained immediately above, with a transition layer 20 therebetween of greater than 1 mm thickness, preferably of at least 2 mm thickness.

The following examples are offered illustratively:

EXAMPLES (All Quantities in the Examples are Parts by Weight)

Example 1

A sample sandwich of a size 380 mm×380 mm was made as follows:

A pre-coat adhesive liquid mixture was made up with the following formulation (parts by weight):

| Ebecryl 1259 (UCB), Urethane Acrylate Oligomer | 75 |
| Ebecryl 150 (UCB), Bisphenol A derivative Diacrylate | 20 |
| Irgacure 184 (Ciba Geigy) | 4 |
| Benzoyl Peroxide | 1 |

The liquid mixture was coated with a wire rod to give a coating thickness of 100 microns onto a 380×380×8 mm polycarbonate with four holes drilled in four corners. The resultant layer was then cured with a 2.5 Kw medium pressure mercury vapor lamp with the lamp 20 cm. above the layer travelling at a speed of 3 meters per minute. A 2 mm thick spacer was provided by a border of two layers of double sided 3M Scotch acrylic adhesive around the polycarbonate on the coated surface. A sheet of 10 mm glass was then placed on top of the polycarbonate and pressed home so that the tape was bonded to it forming an empty cell between the adhesive coated polycarbonate and the glass. Two diagonally opposite holes were stoppered with rubber bungs.

A transition layer liquid mixture was made of the following composition:

| Ebecryl 270 (UCB), Urethane Acrylate Oligomer | 30 |
| Phenoxy ethyl acrylate | 68 |
| Irgacure 184 (Ciba Geigy), 1-hydroxy cyclohexyl phenyl ketone | 2 |

This mixture was slowly pumped through one of the holes in the polycarbonate so that the air was pushed out of the diagonally opposite hole. When all air was eliminated, the remaining two holes were stoppered. The previously stoppered holes were unstoppered to remove any air bubbles that tended to remain in the corners of the cell. The sandwich was then exposed to a 2.5 Kw medium pressure U.V. light at 20 cm. distance and a speed of 2 m/min. via the glass.

A 2 mm spacer was stuck on the glass and a second piece of 10 mm thick glass with holes drilled in each corner was stuck onto it in the same manner as previously described to form a second cell. This second empty cell was then filled as described above with the same transition pre-polymer material and the material was cured by exposure to U.V through the second piece of glass to form a second transition layer.

The completed laminate of three laminae and two transition layers was free of all bubbles, of excellent transparency and free of all defects. The cell was then clamped in a frame and four 9 mm caliber bullets fired at it at a distance of 7 meters. Although the glass layers were removed by impact of the bullets around the bullet holes, the polycarbonate lamina remained unpenetrated.

Example 2

A sandwich was made consisting of 40×40 cms. glass sheets 12 mm, 12 mm and 3 mm thick, bonded together using 0.76 mm polyvinyl butyral as described in U.K. patent No. 1,093,864. The top 12 mm glass was thoroughly cleaned with isopropanol and then coated with a solution of Silane AP134 (Union Carbide) and the solvent was allowed to evaporate, leaving a thin layer of the silane adhesion promoter.

The following pre-coat adhesive mixture was made up:

| Ebecryl 284 (UCB) | 83 |
| Irgacure 651 (Ciba Geigy) | 2 |
| N-vinyl pyrrolidone | 15 |

The mixture was coated onto a 40 cm×40 cm by 8 mm thick polycarbonate having holes drilled at its four corners, and cured as in Example 1. Two mm thick of double sided acrylic tape was stuck to the perimeter of the coated glass, and the polycarbonate sheet was bonded to the tape with the pre-coated side on the inside of the cell formed.

The following transition layer mixture was made up:

| Uvithane 892 (Morton), Urethane Acrylate Oligomer | 32 |
| Irgacure 184 (Ciba Geigy) | 2 |
| Lauryl acrylate | 64 |
| Benzoyl Peroxide | 1 |
| Irgacure 907 (Ciba Geigy), 2-methyl-1[4-methylthio] phenyl-2-mopholino propanone-1 | 1 |

The cell was slowly filled with the above mixture and four syringes full of such material were placed in the four holes. The cell was then placed under 4 Osram L40W/10S Daylight lamps at a distance of 18 cms and left to cure for 48 hours. The resulting product had good clarity and was defect free.

A second polycarbonate sheet was added, the second polycarbonate sheet also being pre-coated with the coating mixture described above, with the pre-coat situated within the cell as previously. The second cell was filled and exposed to curing light as described above. Test firings at 7 meters were then done using four 9 mm bullets and no penetration of the polycarbonate occurred.

Example 3

A pre-coat adhesive mixture was made up with the following formulation (parts by weight):

| | |
|---|---|
| Ebecryl 8800-20R (UCB), Aliphatic Urethane Acrylate Oligomer | 75 |
| Propoxylated Glyceryl Triacrylate | 23 |
| Daracure 1173 (Ciba Geigy), (2-hydroxy-2-methyl-1-phenyl propan-1-one) | 2 |

This liquid was applied with a wire rod to put 75 micron thick coatings onto 38×38 cm, 6 mm thick, acrylic and polycarbonate sheets. Curing was done with a 2.5 Kw medium pressure mercury vapor lamp at 20 cms. distance at a speed of 2 meters per minute. A 3 mm double sided spacer was then stuck around the perimeter of the pre-coated polycarbonate sheet. The following liquid transition layer mixture was prepared:

| | |
|---|---|
| Ebecryl 230 (UCB) | 65 |
| Isobornyl Acrylate | 30 |
| Irgacure 184 (Ciba Geigy), 1-hydroxy cyclohexyl phenyl ketone | 2 |
| Irgacure 907 (Ciba Geigy), 2-methyl-1-[4-{methylthio} phenyl]-2-morpholino propanone | 2 |
| Benzoyl Peroxide | 1 |

Sufficient transition layer material was poured onto the polycarbonate to reach a depth of approximately 1.5 mm. The mixture was then cured by a medium pressure 2.5 Kw mercury vapor lamp at a height of 14 cm. at a speed of 8 meters per minute. More transition layer material was added up to a depth of 3 mm and the acrylic layer was then placed, pre-coated side facing down, on top of this to complete the composite.

The composite was then exposed through the acrylic sheet for 2 minutes using the medium pressure lamp at a distance of 30 cm. The resulting composite was clear, transparent and with no defects. On firing as in previous examples with the firing towards the acrylic, bullets failed to shatter the acrylic and did not damage the polycarbonate.

Example 4

A sample sandwich of a size 38 cm by 38 cm was made up as follows:

10 mm thick glass was coated with the following pre-coat adhesive mixture:

| | |
|---|---|
| Ebecryl 1259 (UCB) | 98 |
| Irgacure 184 (Ciba Geigy) | 2 |

The same material was used to coat 8 mm polycarbonate, Both coatings were cured with a 2.5 Kw medium pressure mercury vapor lamp at 14 cms. above the coating at a speed of 2.5 meters per minute. A 4 mm adhesive spacer was placed on the perimeter of the coated side of the polycarbonate.

The following transition layer pre-polymer material was prepared:

| | |
|---|---|
| Ebecryl 230 (UCB) | 50 |
| Ebecryl 110 (UCB), Oxyethylated Phenol Acrylate | 48 |
| Irgacure 184 (Ciba Geigy) | 2 |

The material was poured onto the polycarbonate to a depth of 2 mm. It was cured with the mercury lamp at a speed of 8.5 meters per minute. The polycarbonate was allowed to cool and more transition material added up to the same height as the top of the spacers. The coated 10 mm glass was then placed coated side down with one edge in contact with one edge of the polycarbonate as shown in FIG. 2. It was then slowly lowered so that a wave of the transition material moved up the cell away from the hinge. When the cell was completely closed, i.e. the glass lying flat, the cell was exposed to U.V. through the glass at a speed of 2.5 meters per minute.

The top surface of the glass was cleaned and coated as previously described in this example with the pre-coat. A 2 mm spacer was affixed to this surface as previously, and the filling with transition layer repeated, using a second 10 mm piece of pre-coated glass. Exposure for curing was as previously described.

A third piece of glass, 4 mm thick, was then bonded onto the second 10 mm glass as previously described. The resulting sandwich was cycled five times from −20° C. to 60° C. in four hour cycles and showed no deterioration. A second sandwich prepared in the same way was cycled through five hour cycles from 30° C. to 60° C. at an R.H. of 95% without showing ill effects.

A third sample also prepared the same way was held in a frame and four 9 mm bullets fired from seven meters. The result was that the glass shattered around the bullet holes. But the polycarbonate together with the transition layer remained intact with severe surface damage but no penetration.

The foregoing description of the specific embodiments will so fully reveal the general nature of the invention that others can, by applying current knowledge, readily modify and/or adapt for various applications such specific embodiments without departing from the generic concept, and, therefores such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A bullet-proof transparent laminate comprising a first transparent lamina adhered to a second transparent lamina, and a transparent solid transition layer between said first lamina and said second lamina, said transition layer having a thickness of at least 1 mm formed of a radiation-cured liquid composition consisting essentially of at least 30 wt % of a urethane acrylate oligomer or aliphatic polyether acrylate oligomer, said cured composition having an elongation of at least 20%, a toughness of greater than 0.02 MPa and an elastic modulus of not greater than 40 MPa.

2. A bullet-proof laminate according to claim 1 wherein said transition layer in liquid form before curing has a viscosity no greater than 1000 cps and is solvent free.

3. A bullet-proof laminate according to claim 1 wherein said transition layer, in liquid form before curing, further contains up to 70% by weight of a monofunctional acrylate based on the total weight of said liquid.

4. A bullet-proof laminate according to claim 3 wherein said monofunctional acrylate is present in an amount of at least 20% by weight based on the total weight of said liquid.

5. A bullet-proof laminate according to claim 3 wherein said monofunctional acrylate is selected from the group consisting of isodecyl acrylate, isobornyl acrylate, tetrahydrofurfuryl acrylate and 2-phenoxy acrylate, methoxyethyl acrylate, isooctyl acrylate, ethoxyethoxyethyl acrylate, ethoxylated nonyl phenol acrylate, lauryl acrylate, and monohydroxy caprolactone monoacrylate.

6. A bullet-proof laminate according to claim 1 wherein said transition layer is at least 2 mm thick.

7. A bullet-proof laminate according to claim 6, further comprising a pre-coat adhesive layer interposed between said transition layer and at least one of said first lamina and second lamina, and wherein said cured composition has an elongation of at least 20%, a toughness of at least 0.1 MPa, and an elastic modulus no greater than 25 MPa.

8. A bullet-proof laminate according to claim 1 wherein at least one of said first lamina and second lamina is glass.

9. A bullet-proof laminate according to claim 1 further comprising a pre-coat adhesive layer interposed between said transition layer and at least one of said first lamina and second lamina.

10. A bullet-proof laminate according to claim 1 wherein said cured composition has an elongation of at least 20%, a toughness of at least 0.2 MPa and an elastic modulus no greater than 25 MPa.

11. A bullet-proof laminate according to claim 1 wherein said transition layer has an elongation of at least 20%, a toughness of at least 0.1 MPa, and an elastic modulus no greater than 20 MPa.

12. A bullet-proof transparent laminate comprising a first transparent lamina adhered to a second transparent lamina, and a transparent solid transition layer between said first lamina and said second lamina, said transition layer having a thickness of at least 1 mm formed of a radiation-cured liquid composition consisting essentially of at least 30% by weight of a urethane acrylate oligomer or aliphatic polyether acrylate oligomer, said cured composition having an elongation of at least 20%, a toughness greater than 0.2 MPa and an elastic modulus not greater than 40 MPa, wherein at least one of said first lamina and second lamina is polycarbonate.

13. A bullet-proof laminate according to claim 12 wherein said liquid composition further comprises 0.1–2% of a peroxide.

14. A bullet-proof transparent laminate made by the method of placing a first transparent lamina on a horizontal surface and providing a dam about its periphery of greater than 1 mm height;

pouring a liquid transition material composition consisting essentially of at least 30 wt % of a urethane acrylate oligomer or aliphatic polyether acrylate oligomer which is curable to a transparent solid having an elongation of at least 20%, a toughness of greater than 0.2 MPa and an elastic modulus of not greater than 40 MPa, on said first lamina within said dam to a height no greater than about one-half the height of said dam, and exposing said liquid transition material composition to light to effect at least partial curing thereof to forman initial thickness of a transition layer;

applying at least one second layer of said liquid transition material composition over said initial thickness of transition layer;

if the height of the liquid transition material composition has not reached the height of said dam, repeating the step of light exposure to effect at least partial curing, and refilling until the liquid transition material composition height reaches the full height of said dam;

slowly lowering a second transparent lamina like a lid about a hinge from one edge of the bottom lamina so as to create a wave of liquid transition material composition and to drive any air bubbles from said liquid transition material composition; and exposing the resultant assembly to light to effect curing of said transition material.

15. A bullet-proof transparent laminate according to claim 14, wherein said liquid composition has a viscosity no greater than 1,000 cps.

16. A bullet-proof transparent laminate according to claim 14, wherein said liquid transition material composition further contains a monofunctional acrylate in an amount of at least 20% and up to 70% by weight based on the total weight of said liquid composition.

17. A bullet-proof transparent laminate according to claim 14, wherein at least one of said first lamina and said second lamina is glass or is polycarbonate, and said liquid transition material composition is essentially solvent free.

18. A bullet-proof transparent laminate according to claim 14, wherein said liquid transition material composition further comprises 0.1–2% of a peroxide.

19. A bullet-proof laminate according to claim 14, wherein said first lamina is plastic and said second lamina is glass.

* * * * *